(12) United States Patent
Polson et al.

(10) Patent No.: US 11,785,309 B2
(45) Date of Patent: *Oct. 10, 2023

(54) SEARCHING FOR AND PRIORITIZING AUDIOVISUAL CONTENT USING THE VIEWER'S AGE

(71) Applicant: DISH Network L.L.C., Englewood, CO (US)

(72) Inventors: Matthew Harris Polson, Castle Rock, CO (US); Xinhua Yang, Englewood, CO (US)

(73) Assignee: DISH NETWORK L.L.C., Englewood, CO (US)

( * ) Notice: Subject to any disclaimer, the term of this patent is extended or adjusted under 35 U.S.C. 154(b) by 32 days.

This patent is subject to a terminal disclaimer.

(21) Appl. No.: 17/696,697

(22) Filed: Mar. 16, 2022

(65) Prior Publication Data

US 2022/0217447 A1 Jul. 7, 2022

Related U.S. Application Data

(63) Continuation of application No. 17/143,928, filed on Jan. 7, 2021, now Pat. No. 11,310,563.

(51) Int. Cl.
*H04N 21/482* (2011.01)
*G06F 16/738* (2019.01)
*H04N 21/45* (2011.01)
*H04N 21/466* (2011.01)
*H04N 21/84* (2011.01)

(52) U.S. Cl.
CPC ....... *H04N 21/4828* (2013.01); *G06F 16/738* (2019.01); *H04N 21/4532* (2013.01); *H04N 21/4668* (2013.01); *H04N 21/84* (2013.01)

(58) Field of Classification Search
CPC .......... H04N 21/4828; H04N 21/4668; H04N 21/84; H04N 21/4532; G06F 16/378
See application file for complete search history.

(56) References Cited

U.S. PATENT DOCUMENTS 8,924,993 B1 * 12/2014 Niebles Duque ........................... H04N 21/23418
725/9
2003/0078972 A1 * 4/2003 Tapissier ............ H04N 21/6181
348/E7.071

(Continued)

FOREIGN PATENT DOCUMENTS

| CN | 110598133 A | 12/2019 |
| KR | 10-2018-0125345 A | 11/2018 |
| WO | 2007/024736 A2 | 3/2007 |

OTHER PUBLICATIONS

International Search Report and Written Opinion for PCT Application No. PCT/US2022/011338, dated Apr. 4, 2022, 35 pages.

*Primary Examiner* — Timothy R Newlin
(74) *Attorney, Agent, or Firm* — Seed IP Law Group LLP

(57) ABSTRACT

Embodiments are directed towards selecting content search results based on the age of the viewer. The content receiver receives search criteria for a viewer, which may include the age of the viewer. The content receiver obtains search results from a search of a plurality of content. The search results are prioritized based on the age of the viewer and presented to the viewer. In this way, searching for "dog" for a four year-old may provide or prioritize different results compared to search for "dog" for an eight year-old.

18 Claims, 4 Drawing Sheets

(56) References Cited

U.S. PATENT DOCUMENTS

| | | | | |
|---|---|---|---|---|
| 2008/0005655 A1* | 1/2008 | Sankaran | ............. | H04N 21/458 715/203 |
| 2008/0155588 A1* | 6/2008 | Roberts | ............ | H04N 21/25808 725/34 |
| 2008/0155602 A1* | 6/2008 | Collet | ................ | H04N 21/8405 725/46 |
| 2008/0320513 A1* | 12/2008 | Wong | ................ | H04N 21/4751 725/38 |
| 2009/0144808 A1* | 6/2009 | Dhananjaya | ........... | G06Q 10/10 726/4 |
| 2009/0300046 A1* | 12/2009 | Abouyounes | ........... | G06F 16/58 707/999.102 |
| 2010/0082604 A1* | 4/2010 | Gutt | ................... | G06F 16/3326 707/E17.014 |
| 2010/0145975 A1* | 6/2010 | Ratiner | ................ | G06F 16/332 707/765 |
| 2010/0191689 A1 | 7/2010 | Cortes et al. | | |
| 2010/0306213 A1* | 12/2010 | Taylor | ................ | G06F 16/9535 707/769 |
| 2011/0066607 A1* | 3/2011 | Wong | ................ | G06F 16/9038 707/706 |
| 2011/0071898 A1* | 3/2011 | Feng | ................. | G06Q 30/0244 705/14.43 |
| 2011/0191180 A1* | 8/2011 | Blackhurst | ......... | G06Q 30/0269 705/14.66 |
| 2011/0231383 A1* | 9/2011 | Smyth | ................ | G06F 16/9535 707/707 |
| 2011/0258173 A1* | 10/2011 | Ratiner | .................. | G06Q 30/02 707/706 |
| 2013/0036121 A1* | 2/2013 | Kim | ...................... | G06F 16/954 707/E17.014 |
| 2014/0230025 A1* | 8/2014 | Abhyanker | ............ | G06Q 50/01 709/204 |
| 2015/0213136 A1* | 7/2015 | Tan | ...................... | H04N 21/251 707/770 |
| 2015/0373419 A1* | 12/2015 | Skokna | ............ | H04N 21/42224 725/43 |
| 2016/0070793 A1* | 3/2016 | Jing | ................... | G06F 16/9535 707/709 |
| 2016/0239498 A1 | 8/2016 | Young et al. | | |
| 2017/0052999 A1 | 2/2017 | Zhang et al. | | |
| 2018/0189630 A1* | 7/2018 | Boguraev | ......... | G06F 16/90332 |
| 2018/0365595 A1* | 12/2018 | Zhou | ..................... | G06N 20/20 |
| 2019/0362101 A1* | 11/2019 | Fisse | ..................... | G06F 16/951 |
| 2020/0035241 A1* | 1/2020 | Chang | .................... | G10L 15/26 |
| 2022/0147870 A1* | 5/2022 | Agarwal | ............... | G06Q 30/0282 |
| 2022/0222688 A1* | 7/2022 | Wang | .................... | G06N 20/00 |

* cited by examiner

SEARCHING FOR AND PRIORITIZING AUDIOVISUAL CONTENT USING THE VIEWER'S AGE

TECHNICAL FIELD

The present disclosure relates generally to audiovisual content presentation and, more particularly, to selecting audiovisual content search results for a viewer based on recently watched content and the viewer's age.

BACKGROUND

Description of the Related Art

Over the past several years, set-top boxes have greatly improved the television viewing experience of viewers. This improvement has been aided by the number of content channels that are available to consume at any given time, the quality of video and audio output devices, and the quality of the input signal carrying the content. As the number of channels increases and as the amount of available content increases, so too does the complexity of finding content to consume. For example, the more channels and content that are available, the more likely that there are going to be overlaps between titles, actors/actresses, and other attributes that describe the content, which can make it difficult to find the correct content. Accordingly, improving the search capabilities of set-top boxes can further improve the viewing experience of viewers. It is with respect to these and other considerations that the embodiments described herein have been made.

BRIEF SUMMARY

Briefly described, embodiments are directed toward systems and methods utilizing a viewer's age to select and recommend content to a viewer. In various embodiments, a viewer inputs search criteria and their age. A database of content is searched for content that is associated with the search criteria. The results of the search are then prioritized or re-prioritized based on the viewer's age and one or more recently watched criteria. The prioritized results are provided to the viewer for selection. In some embodiments, the viewer may provide age-related feedback for the viewer-selected content, such as if the selected content is appropriate or inappropriate for the viewer's age. In this way, the viewer's age is utilized to improve the content searching function or prioritization function for viewers, which can improve the functioning of the content receiver.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

Figure 1:
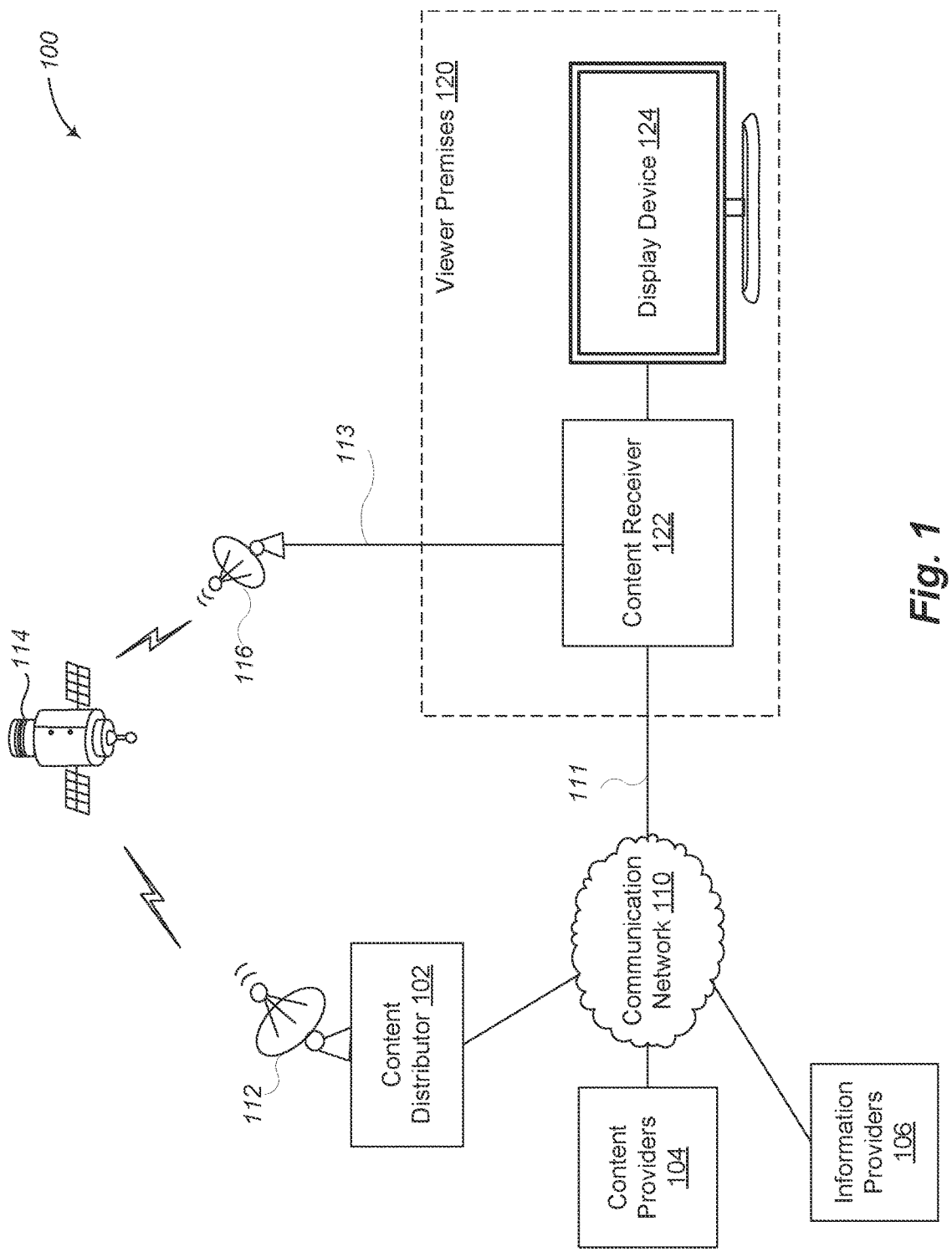
FIG. 1 illustrates a context diagram of an environment for providing audiovisual content to a viewer based on the viewer's age in accordance with embodiments described herein.

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Searching for content can be frustrating for multiple reasons. For example, a child may ask to watch a program but may only know the name of the main character, or the type of animal of the main character, or they may latch onto a secondary character. If a parent is unfamiliar with the program, it can be frustrating finding the content their children are looking for, particularly with a younger child who is unable to verbally express themselves. In other instances, searching for content can be frustrating as the content you are looking for may not be the most popular, requiring you to type in the full name of the program or scroll down a list of live results to find the program you are looking for. As described further herein, an environment for providing more relevant search results is provided which takes into account a viewer's age, search habits, and/or viewing history (e.g., previously watched content) is provided.

FIG. 1 illustrates a context diagram of an environment for providing audiovisual content to a viewer based on the viewer's age, search habits, or previously watched content, or some combination thereof, in accordance with embodiments described herein. Environment 100 includes content providers 104, information providers 106, content distributor 102, communication network 110, and viewer premises 120.

Viewer premises 120 includes a content receiver 122 and a display device 124. The content receiver 122 is a computing device that receives content for presentation on display device 124 to a viewer on viewer premises 120. In some embodiments, the content receiver 122 is separate from the display device 124. In other embodiments, the content receiver 122 and the display device 124 are integrated into a same device.

In some embodiments, the content received by the content receiver 122 is or includes audio content for presentation on one or more audio output devices (not illustrated). Examples of content receiver 122 may include, but are not limited to, a set-top box, a cable connection box, a computer, television receiver, radio receiver, phone, tablet, or any other content receivers. The display device 124 may be any kind of visual content display device, such as, but not limited to a television, monitor, projector, or other display device.

Content receiver 122 enables a viewer to search for content taking into account their age, search habits, or viewing history, or a combination thereof. The viewer can input, using textual inputs or voice commands, search criteria and optionally the viewer's age or other identification to the content receiver, which sends the search criteria, and optionally other information associated with the viewer to the content distributor 102. Content receiver 122 utilizes both the search criteria and the viewer's age or identification to select content to recommend to the viewer.

Children, especially younger children, are more likely to ask to watch content that they have previously watched, rather than new content. Depending upon their age, they may request the content in different ways. For example, a younger child (e.g., two to three years old), may only be able to ask their parent to watch a show based upon an animal in the program or a name of a character therein. If the parent is unfamiliar with the title of the program the child is requesting, they may have to search based upon the words their child can express. In contrast, an older child (e.g., a six years old), may ask their parent to watch a program in a more sophisticated fashion than a younger child, perhaps using the title of the program (in part or in whole), or details of the program such as the name of city mentioned in the program. However, that same six year old may only know how to spell a few words and may only be able to input a search request in the same way a three year old may ask for the program.

Accordingly, in various embodiments, prioritization of search results may take into account a viewer's age, their search habits, their viewing history, or a combination thereof. For example, if a viewer searches for "dog," then the generic search results may include the show "Paw Patrol," whose main characters are dogs, and the movie "Snow Dogs," which includes the term dog in the title. A typical search engine would always prioritize "Snow Dogs" over "Paw Patrol" as, while both programs feature dogs, "Snow Dogs" having the search term in a title would have a higher relevancy score than a program that just features dogs. However, "Snow Dogs" may not be the most relevant result for that individual viewer. As discussed herein, the search results provided by the content receiver 122 are received from the content distributor 102 being prioritized based on the viewer's age, search habits, and viewing history to provide a more accurate search result for the individual viewer. Search results from the from the content distributor 102 may also be re-prioritized by the content receiver 122 on the viewer's age, search habits, and viewing history to provide a more accurate search result for the individual viewer when the content distributor 102 does not individually prioritize the results for the user. For example, if the viewer is a three year-old child who has previously watched the show "Paw Patrol," but has not watched "Snow Dogs" then the search results for "dog" presented to the viewer may be prioritized with "Paw Patrol" being ranked higher than the movie "Snow Dogs," even though the title of "Snow Dogs" includes the search criteria "dog," as a three year old is more likely to be requesting their previously viewed content then a show they have never seen before. By providing search results based upon the individual child's viewing history, the parent is more likely to find the content their child is looking for, reducing the frustration for both the parent and the child.

In contrast, if the viewer is a fourteen year old who searches for the term "dog," then the search results may be prioritized to rank "Snow Dogs" higher than "Paw Patrol," as an older child is more likely to be searching for content about dogs, or a program with dog in the title, then they are to be searching for a show based upon a type of animal depicted by the main character in a show. However, the search habits and viewing history of the user are also taken into account. For example, if that same fourteen year old often searches for the term "dog" then ultimately selects the program "Paw Patrol" thereafter, the search results should prioritize "Paw Patrol" over "Snow Dog" as the viewer is most likely to be searching for "Paw Patrol" based upon their search habits.

Live results can also be prioritized in the same way. For example, if the user enters the letter "L" and frequently thereafter selects the program "Lion Guard," the live results may prioritize the program "Lion Guard" over other perhaps more popular children's programming, such as the movie "Lion King," reducing the number of characters the user must enter to find the programming they are most likely to be seeking and ensuring that the results most relevant to that particular user are at the top of the list.

The searching and prioritization of search results may be performed in a variety of ways, and any combination thereof. In various embodiments, a history of recently watched content is searched for the search criteria relative to the viewer's age. In other embodiments, a database of all available content may be searched for the search criteria, which is then prioritized based on the viewer's age, search habits and viewing history. In some embodiments, all search results are presented to the viewer, but ranked based on age. In other embodiments, only those results that match the viewer's age may be presented to the viewer to both avoid selection of inappropriate content, but to also show results that are more relevant to the viewer. Moreover, in various embodiments, the search results are further prioritized based on recently watched criteria. For example, a weighted combination of how recently was the content watched by the viewer (or a member of the viewer's household) and the viewer's age may be used to prioritize the search results.

Although many embodiments described herein refer to the viewer's age as a single number, such as four years old, embodiments are not so limited. Rather, the viewer's age may be a single number, multiple numbers, or an age range. Likewise, the viewer's age may be based on birth year (e.g., 1983), numerical years of age (e.g., 10 years old), generation information (e.g., "baby boomer," "millennial," etc.), grade level (e.g., first grade), reading level (e.g., second grade reading level), maturity level (e.g., ability to perceive right from wrong and the corresponding consequences), or other designator of the viewer's age.

Viewers may also search for content differently based on their age. For example, adults may search for titles of content, whereas children may search for character names. In some embodiments, the viewer's age may indicate which metadata of the content to search. For example, the title of the content may be analyzed for the search criteria if the viewer is over the age of 20, but the names of characters in the content may be analyzed for the search criteria if the viewer is under 10 years old.

In some embodiments, the content receiver 122 may perform the search based on the viewer's age. In other embodiments, the search results may be prioritized based on the viewer's age. In yet other embodiments, the viewer's age may be used to both determine the search results and prioritize the results. For example, the search results may be determined based on an age range and the results prioritized based on the specific age of the viewer.

Although FIG. 1 illustrates the content receiver 122 as providing content for display on a display device 124 located on the viewer premises 120, embodiments are not so limited. In some embodiments, the content receiver 122 provides the content to a viewer's mobile device (not illustrated), such as a smartphone, tablet, or other computing device, that is at a remote location to the user premises 120. In yet other embodiments, the content receiver 122 and the display device 124 may be integrated into a single computing device, such as the viewer's smartphone, tablet, or laptop.

In various embodiments, the content distributor 102 provides content to the content receiver 122. The content distributor 102 may receive a plurality of different content from one or more content providers 104, one or more information providers 106, or a combination thereof.

The following briefly discusses additional components in example environment 100. The content distributor 102 provides content, whether obtained from content provider 104 or data received from information provider 106, to a viewer through a variety of different distribution mechanisms. For example, in some embodiments, content distributor 102 may provide the content and data to a viewer's content receiver 122 directly through communication network 110 on link 111. In other embodiments, the content may be sent through uplink 112, which goes to satellite 114 and back to downlink station 116 that may also include a head end (not shown). The content is then sent to an individual content receiver 122 of a viewer/customer at viewer premises 120 via link 113.

Typically, content providers 104 generate, aggregate, and/or otherwise provide content that is provided to one or more viewers. Sometimes, content providers are referred to as "channels" or "stations." Examples of content providers 104 may include, but are not limited to: film studios; television studios; network broadcasting companies; independent content producers, such as AMC, HBO, Showtime, or the like; radio stations; or other entities that provide content for viewer consumption. A content provider may also include individuals that capture personal or home videos and distribute these videos to others over various online media-sharing websites or other distribution mechanisms. The content provided by content providers 104 may be referred to as the program content, which may include movies, sitcoms, reality shows, talk shows, game shows, documentaries, infomercials, news programs, sports programs, songs, audio tracks, albums, or the like. In this context, program content may also include commercials or other television or radio advertisements. It should be noted that the commercials may be added to the program content by the content providers 104 or the content distributor 102. Embodiments described herein generally refer to content, which includes visual content, audio content, or audiovisual content that includes a video and audio component.

In at least one embodiment, information provider 106 creates and distributes data or other information that describes or supports content. Generally, this data is related to the program content provided by content provider 104. For example, this data may include metadata, program name, closed-caption authoring and placement within the program content, timeslot data, pay-per-view and related data, or other information that is associated with the program content. In some embodiments, a content distributor 102 may combine or otherwise associate the data from information provider 106 and the program content from content provider 104, which may be referred to as the distributed content or more generally as content. However, other entities may also combine or otherwise associate the program content and other data together. In various embodiments, this additional data may be included with the content as metadata, which may be in embedded with the content or provided as a data stream that is separate from the data stream of the content.

In at least one embodiment, communication network 110 is configured to couple various computing devices to transmit content/data from one or more devices to one or more other devices. For example, communication network 110 may be the Internet, X.25 networks, or a series of smaller or private connected networks that carry the content. Communication network 110 may include one or more wired or wireless networks.

Figure 2:
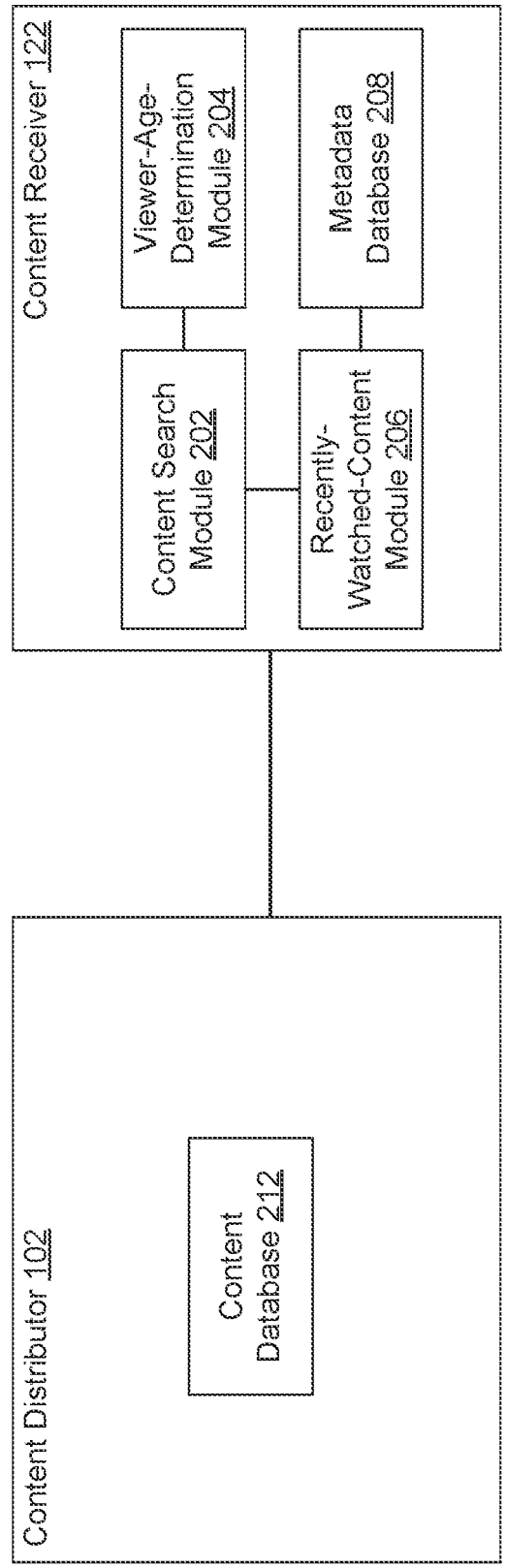
FIG. 2 is a block diagram of a non-limiting embodiment of systems in communication to provide audiovisual content based on the viewer's age in accordance with embodiments described herein.

FIG. 2 is a block diagram of a non-limiting embodiment of systems in communication to provide audiovisual content based on the viewer's age in accordance with embodiments described herein. Example environment 200 includes content distributor 102 in communication with content receiver 122. Environment 200 may be an embodiment of environment 100 in FIG. 1. Other components and computer systems are not shown in FIG. 2 for ease of illustration.

In general, content distributor 102 includes a content database 212. The content database 212 may store, at least temporarily content that is to be distributed to content receiver 122. In various embodiments, each piece of content stored in content database 212 includes or maps to metadata. The metadata stores various information about the corresponding content. In some embodiments, the metadata may include the title of the content, closed captioning information, actors or actresses featured in the content, character names used in the content, scene information (e.g., "the movie where the dogs eat the spaghetti" when referring to the Disney movie "Lady and the Tramp"), or other information that can be used or associated with the content.

Content receiver 122 includes a content search module 202 that is in communication with a recently-watched-content module 206 and a viewer-age-determination module 204. The content search module 202 obtains search criteria from the user. In various embodiments, the content search module 202 accesses the content database 212 to obtain search results based on the obtained search criteria. In some embodiments, the content search module 202 may obtain search results from the content database 212 based on a combination of the search criteria and the viewer's age. The content search module 202 obtains the viewer's age from the viewer-age-determination module 204. The content search module 202 coordinates with the recently-watched-content module 206 to determine which content has been recently watched.

The viewer-age-determination module 204 identifies, selects, or otherwise determines the age of the viewer. In some embodiments, the viewer-age-determination module 204 may maintain information about one or more viewers of the content receiver 122, such as viewer profiles, which are searched based on an input from the viewer selecting a particular viewer profile. In other embodiments, the viewer-age-determination module 204 may obtain the viewer's age by the viewer inputting their age. In yet other embodiments, the viewer-age-determination module 204 may capture images of the viewer via a camera (not illustrated) and perform image recognition techniques to determine the viewer's age. Such image recognition techniques may analyze the viewer's height, gender, facial proportions, skin tones, skin textures, etc.

The recently-watched-content module 206 may store metadata of recently watched content in the metadata database 208. The recently-watched-content module 206 may access the metadata database 208 based on the search criteria, the viewer's age, or the search results obtained by the content search module 202 in response to the search criteria, or based on a combination thereof, to obtain metadata or information regarding recently watched content.

In some embodiments, the content search module 202 may update the metadata database 208 based on feedback from the viewer, such as if the viewer selected or did not select the suggested or recommended content for presentation or if the viewer marked the suggested or recommended content as inappropriate or not applicable to the viewer's age. In some other embodiments, the content search module 202 may provide the viewer feedback to the content distributor 102 to update or modify the corresponding content in the content database 212.

In other embodiments, one or more machine learning or artificial intelligence mechanisms may be employed to improve the searching capability of the content search module 202 over time. In some embodiments, such improvement may be on an individual viewer level, it may be at the individual content receiver level, or it may be the general population level across multiple content receivers. The artificial intelligence mechanisms may employ one or more rules or models for how the content search module 202 prioritizes or ranks the search results based on the viewer's age. For example, if a four-year-old viewer continuously searches for the search term "dog" and then selects "Paw Patrol" instead of "Snow Dogs," then the rules of the artificial intelligence mechanism employed by the content search module 202 may be updated to rank or weight "Paw Patrol" higher than "Snow Dogs" when a four year old searches for the term "dog." In comparison, if a ten-year-old viewer continuously searches for the search term "dog" and fails to select "Paw Patrol," then the rules of the artificial intelligence mechanism employed by the content search module 202 may be updated to rank or weight "Paw Patrol" lower when a ten year old searches for the term "dog." This viewer feedback may also be used as labeled training data to train or re-train artificial intelligence models, which may be employed for individual users, families, or profiles, or it may be employed across a plurality of users in a geographic area.

In some embodiments, the search criteria itself may be used as feedback and added to the metadata database 208 based on a recommendation and subsequent selection by the viewer. For example, if the search criteria is for "Chase" for a four year old and the viewer ultimately selects "Paw Patrol" for viewing, then "Chase" may be added to the metadata of "Paw Patrol" for future searching by the four year old.

Although the content receiver 122 is illustrated as having three modules, embodiments are not so limited; rather, content receiver 122 may have more or fewer modules or components to perform the functions described herein. Moreover, although the content receiver 122 is illustrated as having a single database, embodiments are not so limited; rather, content receiver 122 may have more or fewer databases that can be accessed to perform the functions described herein.

Moreover, although FIG. 2 illustrates the content search module 202, the viewer-age-determination module 204, the recently-watched-content module 206, and the metadata database 208 as being on or performed by the content receiver 122, embodiments are not so limited. In some embodiments, one or more of these components may be executed on or by the content distributor 102, or by a combination of the content distributor 102 and the content receiver 122.

The operation of certain aspects will now be described with respect to FIG. 3. In at least one of various embodiments, process 300 described in conjunction with FIG. 3 may be implemented by or executed via circuitry or on one or more computing devices, such as content receiver 122 or content distributor 102 in FIG. 1, or a combination thereof.

Figure 3:
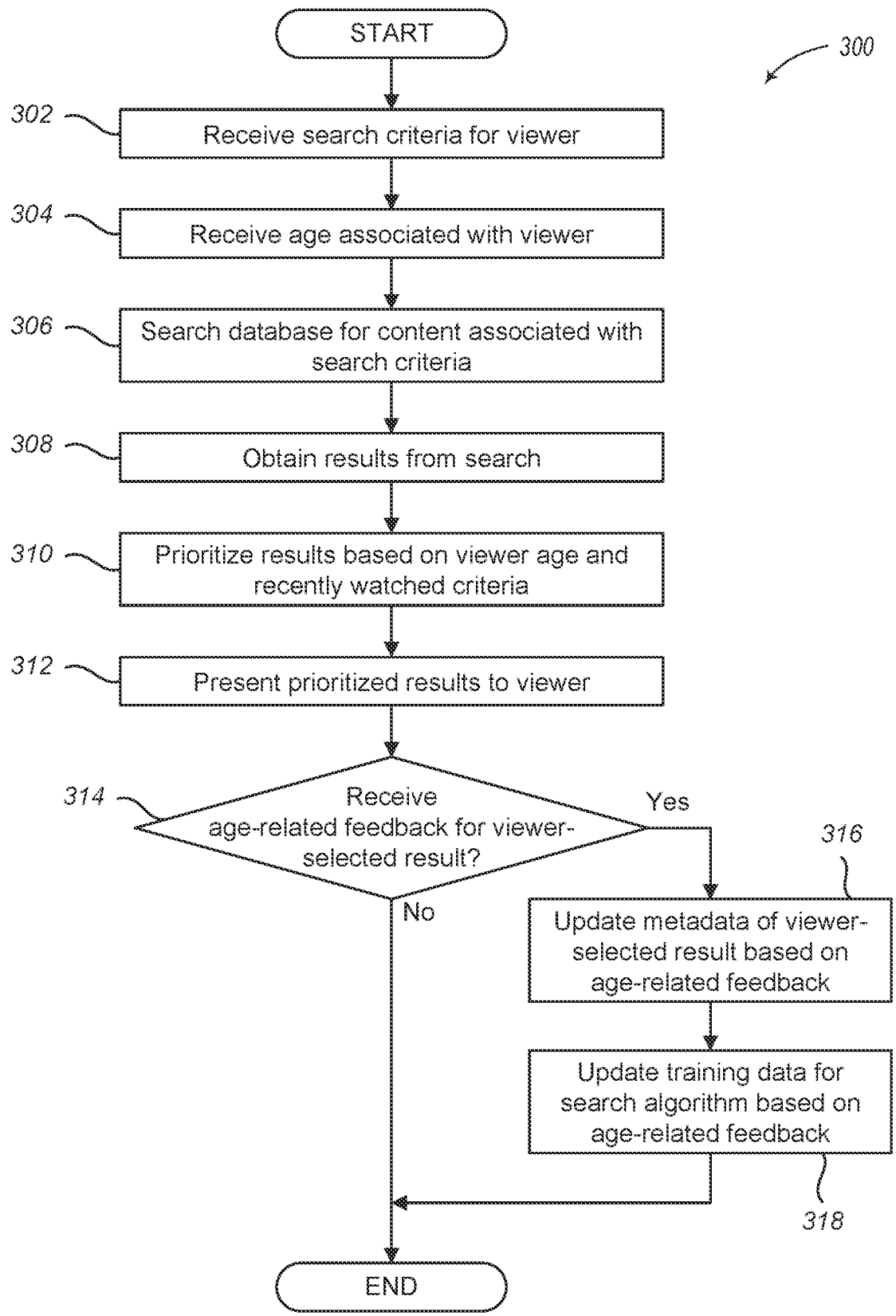
FIG. 3 illustrates a logical flow diagram showing one embodiment of a process for a content receiver to select recently watched content in response to a search based on the viewer's age in accordance with embodiments described herein.

FIG. 3 illustrates a logical flow diagram showing one embodiment of a process 300 for a content receiver to select recently watched content in response to a search based on the viewer's age in accordance with embodiments described herein.

Process 300 begins, after a start block, at block 302, where search criteria for a viewer is received. In various embodiments, the search criteria is received from the viewer via textual or voice-activated input. In some embodiments, the search criteria is a string of one or more words or phrases. In other embodiments, the search criteria may include a time, channel, day, or other information that may be associated with particular content.

Process 300 proceeds to block 304, where the age of the viewer is received. In some embodiments, the viewer may input their age with the search criteria. In other embodiments, the viewer's age may be obtained by accessing a profile of the viewer. In at least one embodiment, the viewer may select a particular profile from a plurality of profiles from which to obtain the viewer's age. In yet other embodiments, a camera may capture images of the viewer and, using facial recognition techniques, determine the viewer's approximate age from images captured by the camera.

In some embodiments, other attributes or characteristics of the viewer may also be used in the search similar to the viewer's age. For example, the viewer's gender may also be obtained. And as described herein, the metadata analyzed for the search criteria may be selected based on the viewer's gender.

Process 300 continues at block 306, where a database is searched for content associated with the search criteria.

In general, the search criteria is one or more alphanumeric characters or words and the search terms are words, phrases, or information that define or identify some aspect of the content. In this way, the search terms can be queried for the search criteria to determine if there is a match. As a few non-limiting examples, the search criteria may be "dog" or "po" (e.g., as the viewer is typing out Poppy) or "police" (e.g., as referring to the police dog "Chase" in the show "Paw Patrol") or "Mary Poppins" or other alphanumeric characters.

In various embodiments, metadata of a plurality of content is searched for the search criteria. Matches between the search criteria and the content, whether by an exact match between the search criteria and the metadata of the content or a partial match, are returned as the search results.

In some embodiments, the metadata may be stored based on different ages or different age groups. For example, the metadata may include a plurality of groups of search terms, where each group is associated with or maps to a different age. The viewer's age is then used to select the corresponding group of search terms for which to compare the search criteria. In other embodiments, one or more search terms may be associated with a particular age. If there is a match between the search criteria and a search term, then the associated age may be compared to the viewer's age, such that there is a match when the age associated with the search term is within a threshold age range from the viewer's age.

The following are two tables illustrating different examples of grouping search terms for different ages for different content.

TABLE 1

| "Paw Patrol" | | |
| --- | --- | --- |
| 0-4 years old | 5-8 years old | 9+ years old |
| Dog | Rescue dogs | Paw Patrol |
| Puppy | Chase | Chickaletta |
| Chicken | Marshall | Ryder |

TABLE 2

| "Snow Dogs" | | |
| --- | --- | --- |
| 0-5 years old | 6-14 years old | 15+ years old |
| N/A—not appropriate for this age group | Dog Artic Alaska | Cuba Gooding Jr. Sled Dog Race Snow Dogs |

These examples illustrate that different content can have different groupings of search terms for different age groups. Although these examples include three age groupings, embodiments are not so limited and different numbers or size of groupings may be used. In some embodiments, the search may be performed independent of the age groupings, but the age groupings may be utilizes to prioritize the search results, such as at block 310 discussed below. In other embodiments, the search may be performed based on a combination of the search criteria and the viewer's age.

In some embodiments, the database of search content may include recently watched content. In some embodiments, the recently watched content may be the most-recently watched content by that particular viewer. In other embodiments, the recently watched content may be the most-recently watched content by other viewers whose age matches the age of the viewer. The most-recently watched content may be content that was watched or consumed within the last threshold amount of time or the last threshold number of days.

Process 300 proceeds next to block 308, where the results from the search are obtained. In some embodiments, the content receiver may receive the search results from a remote computer system that performed the search. In other embodiments, the content receiver itself may perform the search.

Process 300 continues next at block 310, where the search results are prioritized based on the viewer's age. For example, the search results that are associated with an age closest to the viewer's age may be prioritized higher compared to the search results that are associated with an age that is furthest away from the viewer's age.

In some embodiments, the search results may also be prioritized based on whether it was recently watched or not, or whether it was recently watched by a viewer of the same age as the viewer's age. In other embodiments, the suggested content may be further prioritized based on popularity (e.g., the popularity of content for a plurality of content receivers or the popularity of content for a plurality of content receivers for a particular age), recently added, or other attributes.

In some embodiments, the metadata of the search results is analyzed for the viewer's age relative to the search criteria used to perform the search. As mentioned above, the metadata may be stored based on different ages or different age groups. For example, the metadata may include a plurality of groups of search terms, where each group is associated with or maps to a different age. The viewer's age and the search terms are then used to identify a priority of each search result. For example, if the search term is in a same age grouping as the viewer's age for first content, but the search term is in a next older age grouping for second content and in a more-distant age grouping for third content, then the first content may be prioritized over the second and third content, where the second content is prioritized over the third content. In some embodiments, a weighting or ranking may be employed to determine a similarity between the search results and the viewer's age and search criteria.

Process 300 proceeds next to block 312, where the prioritized results are provided to the viewer. In various embodiments, an identifier, such as a title, image, or icon, of the results may be displayed to the viewer.

In some embodiments, the prioritized results are displayed to the viewer in response to the viewer selecting or activating a search button. In other embodiments, results may be prioritized and presented as the search criteria are being entered for the viewer based on the age of the viewer. For example, if a parent is looking for content for their six year old, and the parent starts typing "po" for the character Poppy from the movie "Trolls," then the search results may be prioritized based on character information, rather than title information. As a result, "Trolls" is prioritized over "Mary Poppins." Conversely, if the parent is looking for content for themselves, and the parent starts typing "po," then the title information is prioritized over the character information and "Mary Poppins" is prioritized over "Trolls."

Process 300 continues next to decision block 314, where a determination is made whether age-related feedback is received for the viewer-selected result. In some embodiments, the viewer-selected result is the specific content the viewer selected to watch or consume from the search results. In other embodiments, the viewer-selected result may be specific content that the viewer selected to provide feedback, but did not watch or otherwise consume.

In various embodiments, the age-related feedback may include an indication that the viewer-selected result is inappropriate for the viewer's age and search criteria. For example, if the viewer is a 5 year old and the search criteria is "Chase," but the system prioritizes the movie "Paper Chase" over "Paw Patrol," then the viewer can provide input indicating that "Paper Chase" is not an appropriate search result to prioritize, or even display for a 5 year old.

In other embodiments, the age-related feedback may include additional search terms that would be beneficial for the system to consider for the selected result and the viewer's age. For example, if the selected result is "Paw Patrol" and the viewer is 6 years old, then the viewer can also provide additional feedback indicating that "Rubble" would also be a good search term to consider.

In at least one embodiment, the age-related feedback may be provided by the search criteria itself. For example, assume a 6 year old enters the search criteria "Chase" and "Rubble" and the system presents a result of "Paw Patrol" based on the viewer's age and the search term "Chase." If the viewer then selects and watches "Paw Patrol," then the age-related feedback may indicate that "Rubble" from the search criteria should also be used in searching or prioritizing "Paw Patrol" for 6 year olds.

If age-related feedback is received, then process 300 flows to block 316; otherwise, process 300 flows terminates or otherwise returns to a calling process to perform other actions.

At block 316, the metadata of the viewer-selected result may be updated based on the age-related feedback. For example, the metadata, such as shown in Table 1, could be updated to include "Rubble" in the age grouping for 5-8 year olds for the show "Paw Patrol."

Process 300 continues at block 318, where training data for the search algorithm, or the prioritization algorithm, may be updated based on the age-related feedback. For example, if a four-year-old viewer searches for the search term "dog" and then selects "Paw Patrol" instead of "Snow Dogs," then the search feedback may be used as labeled training data to update the rules of an artificial intelligence mechanism employed to search for or prioritize the content.

After block 318, process 300 may terminate or otherwise return to a calling process to perform other actions.

Figure 4:
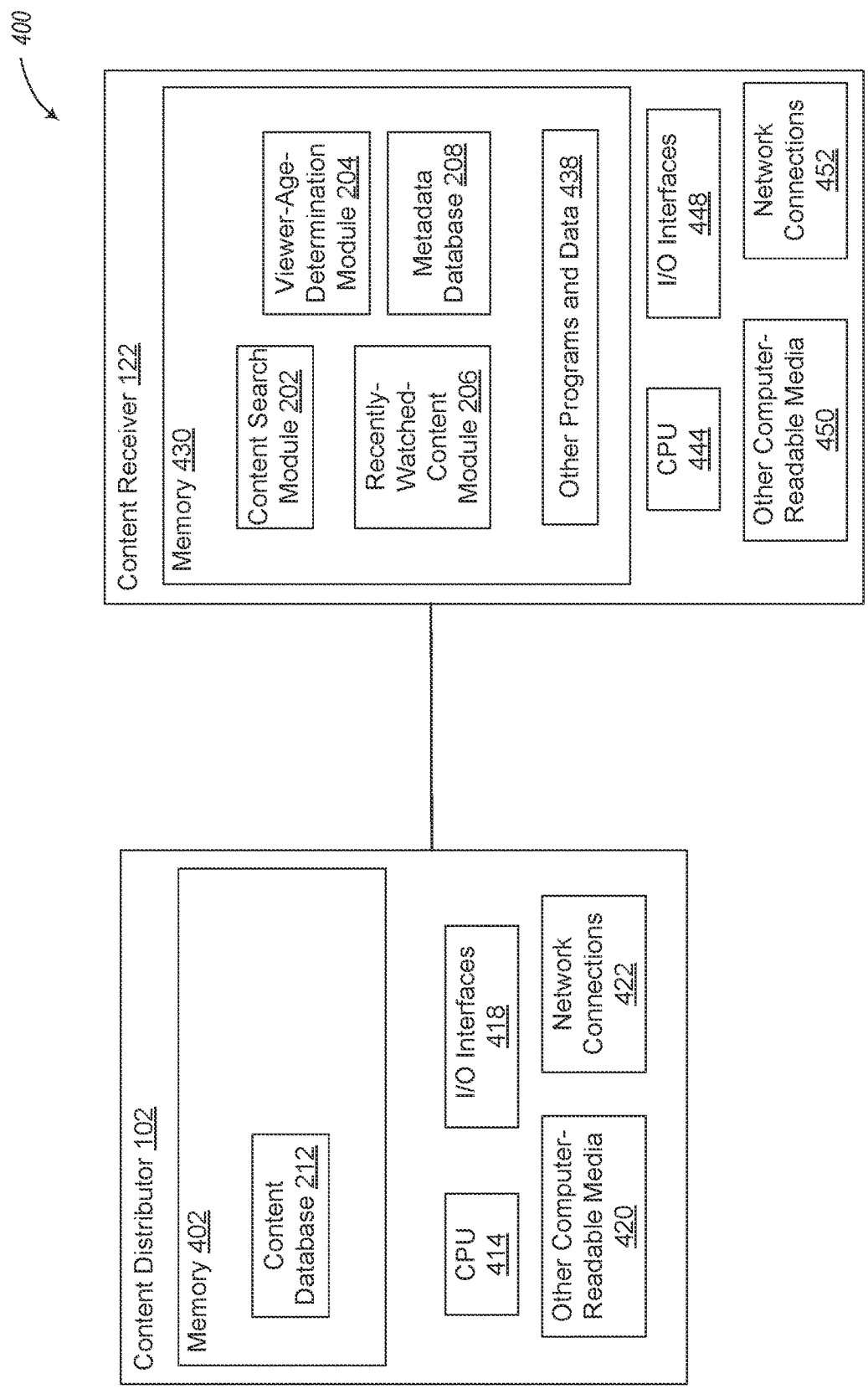
FIG. 4 shows a system diagram that describe various implementations of computing systems for implementing embodiments described herein.

FIG. 4 shows a system diagram that describes one implementation of computing systems for implementing embodiments described herein. System 400 includes content distributor 102 and content receiver 122.

Content receiver 122 receives content and metadata from content distributor 102. One or more special-purpose computing systems may be used to implement content receiver 122. Accordingly, various embodiments described herein may be implemented in software, hardware, firmware, or in some combination thereof. Content receiver 122 may include memory 430, one or more central processing units (CPUs) 444, Input/Output (I/O) interfaces 448, other computer-readable media 450, and network connections 452.

Memory 430 may include one or more various types of non-volatile and/or volatile storage technologies. Examples of memory 430 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 430 may be utilized to store information, including computer-readable instructions that are utilized by CPU 444 to perform actions, including embodiments described herein.

Memory 430 may have stored thereon content search module 202, viewer-age-determination module 204, and recently-watched-content module 206. The content search module 202 coordinates with the viewer-age-determination module 204 and the recently-watched-content module 206 to employ embodiments described herein to select content for recommendation or presentation to a viewer based on the viewer's age and viewer-provided search criteria. The viewer-age-determination module 204 may employ embodiments described herein to determine or select the viewer's age. The recently-watched-content module 206 manages or identifies recently watched content.

Although content search module 202, viewer-age-determination module 204, and recently-watched-content module 206 are shown as separate modules, embodiments are not so limited. Rather, a single module or a plurality of additional modules may be utilized to perform the functionality of content search module 202, viewer-age-determination module 204, and recently-watched-content module 206.

Memory 430 may also store a metadata database 208 and other programs and data 438. The metadata database 208 may be used by the content search module 202 or the recently-watched-content module 206 to obtain or search metadata associated with content to identify content that matches the viewer's search criteria relative to the viewer's age, as described herein. The other programs and data 438 may include other programs, content information, viewer preferences, etc.

I/O interfaces 448 may include one or more input or output interfaces to present content to the viewer or to receive input from the viewer. Examples of such I/O interfaces 448 may include display interfaces, other video interfaces, keyboard, audio interfaces, or the like.

Other computer-readable media 450 may include other types of stationary or removable computer-readable media, such as removable flash drives, external hard drives, or the like.

Network connections 452 are configured to communicate with other computing devices, such as content distributor 102, to facilitate content recommendation and presentation to the viewer.

Content distributor 102 provides content and content metadata to content receiver 122 for the content to be presented to a viewer, as described herein. One or more special-purpose computing systems may be used to implement content distributor 102. Accordingly, various embodiments described herein may be implemented in software, hardware, firmware, or in some combination thereof. Content distributor 102 may include memory 402, one or more central processing units (CPUs) 414, I/O interfaces 418, other computer-readable media 420, and network connections 422, which may be similar to memory 430, CPU 444, I/O interfaces 448, and network connections 452 of content receiver 122.

Memory 402 may include one or more various types of non-volatile and/or volatile storage technologies. Memory 430 may be utilized to store information, including computer-readable instructions that are utilized by CPU 414 to perform actions, including embodiments described herein. In various embodiments, memory 402 may have stored thereon content database 212, which stores content that can be provided to or accessed by content receiver 122. In some embodiments, memory 402 may also include a content search module (not illustrated), viewer-age-determination module (not illustrated), recently-watched-content module (not illustrated), or metadata database (not illustrated) similar to content search module 202, viewer-age-determination module 204, recently-watched-content module 206, and metadata database 208, respectively, of content receiver 122. In this way, content distributor 102, by itself or in combination with the content receiver 122, can recommend content for a viewer of the content receiver 122 based on the viewer's age, as described herein.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   receiving, by a computing device, search criteria for a viewer;
   receiving, by the computing device, an age associated with a viewer;
   obtaining, by the computing device, search results from a search of a plurality of content based on the search criteria, including:
      for each corresponding content of the plurality of content:
         selecting, by the computing device, a group of search terms from a plurality of groups of search terms associated with the corresponding content based on the age of the viewer, wherein each group of the plurality of groups of search terms maps to different ages;
         comparing, by the computing device, the search criteria to the selected group of search terms; and
         identifying, by the computing device, the corresponding content as a search result in response to a match between the search criteria and at least one search term in the selected group of search terms; and
   presenting, by the computing device, identifiers of the search results to the viewer.

2. The method of claim 1, wherein selecting the group of search terms includes:
   determining, by the computing device, that the age of the viewer is associated with a first age that is different from a second age; and
   selecting, by the computing device, a first plurality of search terms that are mapped to the first age for the corresponding content, wherein the first plurality of search terms is different from a second plurality of search terms that are mapped to the second age for the corresponding content.

3. The method of claim 1, wherein selecting the group of search terms includes:
   determining, by the computing device, that the age of the viewer is within an age range of a plurality of age ranges; and
   selecting, by the computing device, a plurality of search terms that are mapped to the age range in which the age of the viewer is within.

4. The method of claim 1, wherein presenting the identifiers of the search results to the viewer comprises:
   prioritizing, by the computing device, the search results based on the age of the viewer; and
   presenting, by the computing device, the identifiers of the prioritized search results to the viewer.

5. The method of claim 1, further comprising:
   prioritizing, by the computing device, the search results based on at least one recently watched criteria and based on the age of the viewer.

6. The method of claim 1, further comprising:
   selecting, by the computing device, the plurality of content from a database of search content based on recently watched content associated with the age of the viewer.

7. The method of claim 1, further comprising:
   selecting, by the computing device, the plurality of content from a database of search content based on recently watched content by other viewers whose age matches the age of the viewer.

8. A content receiver, comprising:
   a transceiver that receives content;
   a memory that stores computer instructions; and
   at least one processor that, when executing the computer instructions, causes the content receiver to:
      receive search criteria for a viewer having an age;
      search each corresponding content of a plurality of content for search results based on a comparison between the search criteria and a group of search terms selected from a plurality of groups of search terms associated with the corresponding content based on the age of the viewer, wherein each group of the plurality of groups of search terms maps to different ages; and
      present identifiers of the search results to the viewer.

9. The content receiver of claim 8, wherein the at least one processor, when executing the computer instructions to search each corresponding content of the plurality of content, further causes the content receiver to:
   determine that the age of the viewer is associated with a first age that is different from a second age; and
   select a first plurality of search terms that are mapped to the first age for the corresponding content, wherein the first plurality of search terms is different from a second plurality of search terms that are mapped to the second age for the corresponding content.

10. The content receiver of claim 8, wherein the at least one processor, when executing the computer instructions to search each corresponding content of the plurality of content, further causes the content receiver to:
    determine that the age of the viewer is within an age range of a plurality of age ranges; and
    select a plurality of search terms that are mapped to the age range in which the age of the viewer is within.

11. The content receiver of claim 8, wherein the at least one processor, when executing the computer instructions to present the identifiers of the search results to the viewer, further causes the content receiver to:
    prioritize the search results based on the age of the viewer; and
    present the identifiers of the prioritized search results to the viewer.

12. The content receiver of claim 8, wherein the at least one processor, when executing the computer instructions, further causes the content receiver to:
    prioritize the search results based on at least one recently watched criteria and based on the age of the viewer.

13. The content receiver of claim 8, wherein the at least one processor, when executing the computer instructions, further causes the content receiver to:
    select the plurality of content from a database of search content based on recently watched content associated with the age of the viewer.

14. The content receiver of claim 8, wherein the at least one processor, when executing the computer instructions, further causes the content receiver to:

select the plurality of content from a database of search content based on recently watched content by other viewers whose age matches the age of the viewer.

15. A non-transitory processor-readable storage medium having instructions stored thereon that, when executed by one or more processors, cause the one or more processors to perform actions, the actions comprising:
   receiving a search request for a viewer, the search request includes search criteria;
   identifying a plurality of content for the viewer based on the search criteria;
   receiving feedback from the viewer indicating a particular content from the plurality of content was viewed by the viewer;
   determining an age of the viewer; and
   updating metadata of the particular content to include a mapping between the age of the viewer to the search criteria for the particular content.

16. The non-transitory processor-readable storage medium of claim 15, wherein the metadata stores mappings between a plurality of groups of search terms and different ages.

17. The non-transitory processor-readable storage medium of claim 15, wherein execution of the instructions by the one or more processors, cause the one or more processors to perform further actions, the further actions comprising:
   receiving a second search request for a second viewer, the second search request includes the search criteria;
   determining an age of the second viewer; and
   in response to determining that the age of the second viewer matches the age of the viewer, providing the particular content to the second viewer.

18. The non-transitory processor-readable storage medium of claim 15, wherein execution of the instructions by the one or more processors, cause the one or more processors to perform further actions, the further actions comprising:
   receiving a second search request for a second viewer, the second search request includes second search criteria;
   determining a second age of the second viewer;
   selecting a group of search terms from a plurality of groups of search terms associated with the particular content based on the second age of the viewer;
   comparing the second search criteria to the selected group of search terms; and
   providing the particular content to the second viewer in response to a match between the second search criteria and at least one search term in the selected group of search terms.

* * * * *